United States Patent Office 2,718,501
Patented Sept. 20, 1955

2,718,501

OILS STABLE AGAINST OXIDATION

Oliver L. Harle, Berkeley, Calif., assignor to California Research Corporation, San Francisco, Calif., a corporation of Delaware No Drawing. Application March 1, 1952,
Serial No. 274,519

2 Claims. (Cl. 252—47)

The present invention relates to the stabilization of oils against oxidative deterioration. More particularly, the invention has to do with the preparation of an oleaginous composition comprising a major amount of a normally oxidizable oil and a minor amount each of an organic sulfur compound and an aromatic amine, each being selected from specific classes of organic sulfur compounds and of aromatic amines, respectively. In accordance with the invention, it has been found that the combination of the aforesaid organic sulfur compound and aromatic amine has a synergistic antioxidant effect.

Among the adverse effects caused by oxidation may be mentioned the formation of corrosive acidic products, sludges, varnishes, resins and other oil-insoluble products, as, for example, with mineral oils. Other oils, such as certain synthetic hydrocarbons, tend to further polymerize on oxidation, thus becoming undesirably viscous, while other synthetic oils, for example, the polyalkylene glycol type, tend to depolymerize giving off volatile products. Other oils thicken and become rancid, for example the animal and vegetable fatty oils.

Now I have found that I can substantially increase the resistance to oxidation of these oils and others, whereby their quality and nature are maintained unimpaired over a long period of time either during use or in storage, by the incorporation in the oil of a small amount of an organic aliphatic sulfur compound in addition to a small amount of an organic aromatic amine.

More specifically, the organic aliphatic sulfur compound is one which is soluble in the oil at least to the extent of about 0.1%, preferably 0.25% by weight of the oil, and which has a molecular weight of at least about 150. Moreover, the sulfur compound is one which falls within the group consisting of mercaptans, monosulfides and polysulfides.

These organic sulfur compounds may be represented by the formula $$RS_xR_1$$

wherein S represents sulfur; $x$, a whole number having a value of 1 to 5; and R and $R_1$, like or different organic radicals such as alkyl groups. When $x$ is 1, $R_1$ may be hydrogen.

The alkyl groups R and $R_1$ can, moreover, have substituent groups or radicals. These substituent groups can be amino, hydroxyl, mercapto, alkoxy, aryloxy, thio, alkyl, aryl, alkaryl and aralkyl radicals. Substituent groups containing oxygen which are acidic or acid strengthening in nature and which are not further oxidizable, such as nitro, sulfonic acid, and carboxyl radicals are less desirable and for practical purposes are avoided.

Also contemplated by the invention are the selenium compounds corresponding to the sulfur compounds above described.

Specific examples of sulfur and selenium compounds which can be employed in carrying out the invention are dicetyl sulfide, cetylethylsulfide, dioctadecyldisulfide, dicetyltrisulfide, dicetyltetrasulfide, wax sulfide (obtained from petroleum wax by chlorination and reaction of the chlorinated product with $Na_2S_2$), cetyl mercaptan, dilauryl selenide, dilauryl diselenide, octadecyl selenomercaptan, dibenzyl sulfide, N,N'-tetramethyl 2,2'-diaminodiethyl sulfide, 2,2'-diphenoxydiethyl sulfide, di(2-ethylhexyl) sulfide, diethyldithiane, 3,3'-dihydroxy dipropyl disulfide, and 3-ethoxypropyl decyl sulfide.

In general, the amount of sulfur compound required for substantial inhibition of the base oil against oxidation ranges from about 0.1% to about 5% by weight of the finished oil, a satisfactory working amount residing within about the range of 0.25% to 2.0%, with an optimum of about 1.0%, by weight of the finished oil.

The aromatic amine compound contemplated by the invention is one that has a minimum aromaticity of at least two aromatic rings. That is, the aromatic rings may be uncondensed, as in, for example, diphenylamine, or fused or condensed, as in, for example, the polynuclear aromatic amine β-naphthylamine.

Also suitable are the foregoing aromatic amines containing substituent groups on the ring portion of the molecule, with preferably the ortho or para position in respect to the nitrogen in at least one ring being free. Also suitable are aromatic amine compounds having one remaining amino hydrogen, the other hydrogen having been replaced by substituent groups or radicals. The substituent groups on either the ring or nitrogen portion of the molecule can be amino, hydroxyl, mercapto, alkoxy, aryloxy, thio, alkyl, aryl, alkaryl, and arylalkyl radicals. Substituent groups containing oxygen which are acidic or acid strengthening in nature and which are not further oxidizable, such as the nitro, carboxyl and sulfonic acid radicals, are less desirable and for practical purposes are avoided. Moreover, the aromatic amine compound is one that is soluble in the base oil to the extent of at least 0.03% and preferably at least 0.2% by weight of the base oil.

Specific examples of aromatic amine compounds falling within the purview of the invention are phenyl-α-naphthylamine, α-naphthylamine, diphenylamine, p-hydroxy-diphenylamine, di-β-naphthyl p-phenylene diamine, phenothiazine, p-i-propoxy diphenyl amine, p,p'-didodecyldiphenylamine, carbazole, benzidine, 1-amino-2-hydroxynaphthalene, N,N'-diphenyl p-phenylenediamine, and 1-amino-4-t-butylnaphthalene.

In general, the amount of aromatic amine inhibiting compound employed in accordance with the invention resides within about the range of 0.03% to 5% by weight of the finished oil, and preferably 0.05% to 2.0%, by weight of the finished oil.

Examples of commercially available base oils which may be benefited by the practice of the present invention are highly refined mineral hydrocarbon lubricating oils, which because of the exhaustive refining thereof contain substantially no aliphatic sulfur materials, for example, white oil. Other base oils are synthetic hydrocarbon oils or olefin polymer oils, for example the polybutenes and others derived from the lower olefins, such as ethylene, the propylenes, pentenes, etc., and from the Fischer-Tropsch process. Additional examples of base oils are the polyalkylene glycols of lubricating oil viscosity derived most advantageously from 1,2-propylene oxide, these oils preferably having the terminal hydroxyl groups esterified and/or etherified. Also advantageously treated in accordance with the invention are the diester oils, that is, those derived from the esterification of certain dicarboxylic acids, for example adipic and sebacic, with alcohols, for example butyl, hexyl and octyl alcohols. Another important class of synthetic base oils are those containing silicon, for example the orthosilicates, and preferably those in which the alkyl groups attached to oxygen bound to silicon contain at least three carbon atoms in branched chain structure, for example bis(2- butyl)bis (2-ethyl-1-butyl)silicate, and isopropyl-tris(2-pentyl)silicate; and the polysiloxanes such as hexa(2-ethyl-1-butoxy)disiloxane.

A convenient method of measuring the resistance to oxidation possessed by the compositions prepared in accordance with the invention is the use of the apparatus and procedure described in Industrial and Engineering Chemistry, vol. 28, p. 26, (1936), wherein the rate of oxygen absorption at constant pressure by a definite weight of oil is regarded as a measure of the oxidative stability of the oil. According to this procedure, the oil sample is placed in an absorption cell, provided in the bottom with a fine-fitted glass filter to disperse the oxygen stream, circulating through the system at a constant rate, into fine bubbles. In obtaining the data hereinbelow appearing, the following modified apparatus and procedure were employed:

The oxidation or absorption cell is constructed of a large glass tube with the head portion having a connection for introducing oxygen, an annular space surrounding the upper end of the tube and a fitting for a removable high speed glass stirrer. The annular space contains potassium hydroxide pellets for the removal of water, carbon dioxide, volatile aldehydes, etc. The lower portion of the cell which contains the sample to be tested is immersed in an oil bath at a temperature of about 340° F. During the test, the oil sample is rapidly agitated by means of a high speed stirrer and is kept under a pressure of about 1 atmosphere of pure oxygen, the volume of oxygen added being automatically recorded. The time in hours required for 100 grams of oil to absorb 1200 cc. of oxygen is called the "Induction Period" (I. P.), and represents the point at which the sample begins to absorb oxygen or oxidize.

The following tabulated data were obtained from a number of experiments performed in accordance with the test above described.

In Table I, the base oil employed was a medicinal white oil having a viscosity of about 350 SSU at 100° F. It was prepared from a suitable distillate fraction of a California naphthenic type crude by phenol treatment followed by exhaustive treatment with fuming sulfuric acid and finished by percolating through fuller's earth. Moreover, in order to accelerate or catalyze oxidation, about eight pieces each of No. 14 iron wire and No. 14 copper wire, cut up into lengths of about 1 cm., were stirred in with the base oil. In each experiment about 0.1 per cent phenyl-α-naphthylamine, by weight of the oil, was employed as the aromatic amine compound. The organic sulfide compound was employed in an amount of 0.5 per cent by weight of the oil.

TABLE I

*Anti-oxidant effect of aromatic amine and various sulfides on white oil*

| Organic Sulfide | Percent Sulfur Compound | Percent Phenyl-α-Naphthylamine | Induction Period, Hrs. at 340° F. | | |
|---|---|---|---|---|---|
| | | | With Organic Sulfide and Phenyl-α-Naphthylamine | With Phenyl-α-Naphthylamine but without Organic Sulfide | Without Phenyl-α-Naphthylamine but with Organic Sulfide |
| 1. Dicetyl sulfide | 0.5 | 0.1 | 7.2 | 1.2 | 0.0 |
| 2. Dioctadecyldisulfide | 0.5 | 0.1 | 7.2 | 1.2 | 0.6 |
| 3. Dicetyltrisulfide | 0.5 | 0.1 | 16.8 | 1.2 | 2.7 |
| 4. Dicetyltetrasulfide | 0.5 | 0.1 | 27.1 | 1.2 | 1.8 |
| 5. Wax Disulfide (M. W., about 250.) | 0.5 | 0.1 | 10.0 | 1.2 | 0.2 |

From the foregoing table it will be noted that the combination of aromatic amine and organic sulfide has far greater anti-oxidant effect on the base oil than either material taken alone, that is, more than the expected or additive effect of the two. For example, in Run No. 4 the use of 0.5% dicetyltetrasulfide and 0.1% phenyl-α-naphthylamine resulted in an induction period of 27.1 hours; without the sulfide, but with 0.1% phenyl-α-naphthylamine, the induction period was 1.2 hours; without aromatic amine, but with 0.5% of the sulfide, the induction period was 1.8 hours. The percentages given in the foregoing table and in the following tables are by weight of the finished composition.

The data in Table II are given to illustrate the even greater effect obtained when the oil contains no oxidation catalyst.

TABLE II

*Anti-oxidant effect of aromatic amine and organic sulfide on white oil containing no oxidation catalyst*

| Organic Sulfide | Percent Sulfide | Percent Phenyl-α-Naphthylamine | Induction Period, Hrs. at 340° F. | | |
|---|---|---|---|---|---|
| | | | With Organic Sulfide and Phenyl-α-Naphthylamine | With Phenyl-α-Naphthylamine but without Organic Sulfide | Without Phenyl-α-Naphthylamine but with Organic Sulfide |
| 1. Dicetylsulfide | 0.5 | 0.1 | 54.7 | 2.0 | 0.4 |
| 2. Dicetylsulfide | 1.0 | 0.1 | 170.0 | 2.0 | 0.6 |
| 3. Dioctadecyldisulfide | 0.5 | 0.1 | 44.2 | 2.0 | 4.2 |
| 4. Cetylmercaptan | 0.5 | 0.1 | 60.8 | 2.0 | 1.0 |

Table III is intended to illustrate the anti-oxidant effect on the same base oil as employed in Tables I and II by a representative number of aromatic amines and dicetyl sulfide.

TABLE III

*Anti-oxidant effect of various aromatic amines and organic sulfide on white oil*

| Aromatic Amine | Percent Aromatic Amine | Percent Dicetyl Sulfide | Induction Period, Hrs. at 340° F. | | |
|---|---|---|---|---|---|
| | | | With Dicetyl Sulfide and Aromatic Amine | Without Dicetyl Sulfide but with Aromatic Amine | Without Aromatic Amine but with Dicetyl Sulfide |
| 1. Phenyl-α-Naphthylamine | 0.10 | 0.5 | 54.7 | 2.0 | 0.4 |
| 2. α-naphthylamine | 0.068 | 0.5 | 13.0 | 0.6 | 0.4 |
| 3. Diphenylamine | 0.079 | 0.5 | 27.0 | 0.6 | 0.4 |
| 4. p-Hydroxy diphenylamine | 0.086 | 0.5 | 85.0 | 4.7 | 0.4 |
| 5. Carbazole | 0.078 | 0.5 | 7.5 | 0.3 | 0.4 |
| 6. Di-β-naphthyl-p-phenylene diamine | 0.084 | 0.5 | 21.0 | 0.3 | 0.4 |
| 7. Phenothiazine | 0.093 | 0.5 | 95.0 | 21.5 | 0.4 |

The data accumulated in Table IV illustrates the anti-oxidant effect of aromatic amines and organic sulfide of the types defined on a representative number of base oils.

TABLE IV

*Anti-oxidant effect of aromatic amine and organic sulfide on various base oils*

| Base Oil | Induction Period, Hrs. at 340° F. | | |
|---|---|---|---|
| | Except as indicated, with 0.1% Phenyl-α-Naphthylamine and 0.5% Dicetyl Sulfide | Except as indicated, only 0.1% Phenyl-α-Naphthylamine | Except as indicated, only 0.5% Dicetyl Sulfide |
| Polybutene (M. W., about 400) | 6.0 (0.2% Phenyl-α-Naphthylamine) | 0.0 (0.2% phenyl-α-Naphthylamine) | 0.0. |
| Bis(2-ethylhexyl) sebacate | 97.0 | 12.0 | 0.0. |
| Tetra(2-ethylbutyl) silicate | 14.8 | 1.6 | 0.0. |
| Tricresyl phosphate | 18.2 | 3.1 | 0.3. |
| Polypropylene glycol* | 6.0 (0.25% Phenyl-α-Naphthylamine; 3% Dioctyl Sulfide) | 0.2 (0.25% phenyl-α-Naphthylamine) | 0.0 (3% dioctyl sulfide). |
| Polypropylene glycol (+50%, by volume, mineral white oil**) | 7.0 | 0.3 | 0.0. |
| Hexa-sec.-butyl disiloxane | 9.3 | 0.9 | 0.0. |

*Ethylhexanol-initiated propene oxide polymer, mol. wt. about 900.
**"Polypropylene glycol"=isooctanol-initiated propene oxide polymer acetate, mol. wt. about 600.
"Mineral white oil"=stock prepared as previously described (Column 4, lines 4-14), but with a viscosity of about 72 SSU at 100° F.

Obviously many modifications and variations of the invention as hereinbefore set forth may be made without departing from the spirit and scope thereof, and therefore only such limitations should be imposed as are indicated in the appended claims.

I claim:

1. An oil composition having improved stability toward oxidation, said composition comprising a major proportion of a normally oxidizable oil together with a total of from about 0.1 to 2 per cent by weight of at least one compound selected from the group consisting of aliphatic hydrocarbon mercaptans, aliphatic hydrocarbon sulfides and aliphatic hydrocarbon polysulfides, said compounds each having a molecular weight of at least 150, and a total of from 0.03 to 0.5 per cent by weight of at least one aromatic amine selected from the group consisting of phenyl-α-naphthylamine, α-naphthylamine, diphenylamine, p-hydroxy diphenylamine, carbazole, di-β-naphthyl-p-phenylene diamine and phenothiazine.

2. The composition of claim 1 wherein the sulfur-containing compound is dicetylsulfide and the aromatic amine is phenyl-α-naphthylamine.

References Cited in the file of this patent

UNITED STATES PATENTS

| | | |
|---|---|---|
| 1,752,946 | Evans | Apr. 1, 1930 |
| 2,346,356 | Burk | Apr. 11, 1944 |
| 2,354,252 | Fraser et al. | July 25, 1944 |
| 2,473,510 | Denison et al. | June 21, 1949 |
| 2,526,041 | Olin | Oct. 17, 1950 |